(12) United States Patent
Whitefield et al.

(10) Patent No.: US 6,512,985 B1
(45) Date of Patent: Jan. 28, 2003

(54) PROCESS CONTROL SYSTEM

(75) Inventors: Bruce J. Whitefield, Camas, WA (US); Manu Rehani, Portland, OR (US); John A. Knoch, Troutdale, OR (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/574,365

(22) Filed: May 19, 2000

(51) Int. Cl.[7] .............................................. G06F 19/00
(52) U.S. Cl. ........................ 702/81; 702/82; 702/83; 702/84; 700/17; 324/158.1; 209/571
(58) Field of Search ............................. 702/81, 82, 83, 702/84; 700/17; 324/158.1; 209/571

(56) References Cited

U.S. PATENT DOCUMENTS

| | | | | |
|---|---|---|---|---|
| 4,967,381 A | * | 10/1990 | Lane et al. ................... | 700/17 |
| 6,055,463 A | * | 4/2000 | Cheong et al. ............. | 209/571 |
| 6,140,832 A | * | 10/2000 | Vu et al. ................. | 324/158.1 |
| 6,223,098 B1 | * | 4/2001 | Cheong et al. ............. | 209/571 |

* cited by examiner

*Primary Examiner*—John Barlow
*Assistant Examiner*—Stephen J. Cherry
(74) *Attorney, Agent, or Firm*—Luedeka, Neely & Graham, P.C.

(57) ABSTRACT

A computerized system for analyzing information associated with a process unit. A database contains historical information relating to previously compiled information. A secure input receives criteria from a restricted source. A computer mathematically determines a limit based upon the criteria. An open input receives the information associated with the process unit from multiple test locations. A compiler selectively adds to the database of historical information the information. The computer also selects at least a portion of the information based upon selection criteria. In addition, the computer manipulates the selected information based upon manipulation criteria. The manipulated information is compared against the limit. An output indicates a first disposition of the process unit when the manipulated information violates the limit. The output indicates a second disposition of the process unit when the manipulated information does not violate the limit.

20 Claims, 2 Drawing Sheets

PROCESS CONTROL SYSTEM

FIELD

This invention relates to the field of process control. More particularly the invention relates to analyzing defect data from historical and tolerance perspectives.

BACKGROUND

Many processes, such as wafer processing in the semiconductor industry, utilize testing of the process material at various points in the process. There are many reasons why the process material is tested. One reason is to determine whether the process material meets the design specifications required for the process material to be of value. Another reason is to determine whether the process itself, such as the equipment and methods used in the process, is inherently capable of producing process material that meets the design specifications.

In the specific example of wafer processing, as introduced above, such testing is typically performed according to a method as described below. An operator or technician takes readings on the wafer either by direct inspection, such as under a microscope, or by processing the wafer through a specialized test instrument. Regardless of the specific method used, the operator gathers property information in regard to one or more process characteristics that are determinable by inspection of the wafer by one or more of the methods mentioned above.

The operator prepares a summary of the test that was performed and the results that were obtained in regard to the process characteristics sensed during the test. Depending on factors such as the complexity of the test, the ambiguity of the results, or the number of process characteristics sensed, the operator may spend forty-five minutes or more preparing such a summary. The operator then checks the summary results against published specification limits for the process characteristics sensed, such as statistical process control charts. The statistical process control charts may be in either hard copy form, such as might be posted on the processing or testing equipment itself, or in soft copy form, such as resident in the processing or testing equipment controllers, or in some other computerized device.

The operator makes a determination as to whether the process material, in this example the wafer, passes or fails the test based on the comparison of the test results for the process characteristics and the published specification limits. This is often not as easy to do as it may initially appear. For example, the property information for the process characteristics may indicate failure of the wafer based on the specification limits as to some aspects of the process characteristics, but may also indicate acceptance of the wafer based on the specification limits as to other aspects of the process characteristics. At times, different tests of the same process characteristics may give differing results, some which tend to indicate failure of the wafer, and others which tend to indicate acceptance of the wafer. In addition, test results may be at the borderline of the published specification limits, and thereby fail to indicate either failure of the wafer or acceptance of the wafer.

In such borderline cases, or in cases where the wafer fails the test, the operator may further review the results of the test, or perform additional tests on the wafer to generate additional data to help form a more clear indication of whether the wafer should be failed or passed. What additional tests to perform is typically left to the discretion of the operator, and varies widely from person to person. The additional test information, together with the original test results, are then held for the review of an engineer who has responsibility for the specific process steps and tests involved. The wafer may be on hold for a day or more before the designated engineer has the opportunity to review the test results.

Upon review of the test results, the engineer makes a decision as to whether the wafer is passed or failed. Because the engineer tends to make a subjective decision based upon the personal experience and judgment of the engineer as formed over a period of time, the decisions made by different engineers tend to be different one from the other. For example, one group of engineers may believe that a first given set of factors takes precedent over a second given set of factors when forming a decision, and another group of engineers may believe that the second given set of factors takes precedent over the first given set of factors when forming a decision. Further, the same engineer may make seemingly inconsistent decisions when faced with the same criteria, depending upon his feelings or other apparently irrelevant criteria existing at the time of the decision.

Further, the engineer may take other steps in addition to passing or failing the wafer based on the results of the test. For example, the engineer may modify the published specification limits based on the results of the test. The modification made by the engineer may be different than and even contrary to the modification that may be made by a different engineer, as described above. The change to the specification made by the engineer may not be brought to the immediate attention of all of the operators performing the test. In this manner, operators may mistakenly pass or fail wafers inconsistently for a period of time, until all of the operators are made aware of the new specification limits. Further, the engineer may change the process settings for the wafers that are yet to be processed, based on the results of the test.

Thus, there are many problems inherent with the system as described above. For example, because of the very manual nature of the system, only a relatively limited amount of test limits can be analyzed by the operators performing the tests. Additionally, because the operator has the responsibility to compare the results of the test to the specification limits, there is a likelihood that the operator will make comparison errors and select an incorrect disposition for the wafer. Further, all decisions made in regard to the wafer are based on the differing individual experiences and attitudes of the people who make the decisions. Thus, not only is such a system extremely time consuming, it also produces inconsistent results.

What is needed, therefore, is a system for automating, broadening and standardizing the criteria base by which wafer pass and fail decisions, specification limit change decisions, and process control change decisions are made.

SUMMARY

The above and other needs are met by a computerized system for analyzing property information associated with a process characteristic of a process unit. A database contains historical information relating to previously compiled property information associated with the process characteristic. Secure input means receive limit criteria, compilation criteria, selection criteria, manipulation criteria, and disposition criteria from a restricted source. Computer means mathematically determine a limit based upon the limit criteria. Open input means receive the property information associated with the process characteristic of the process unit from multiple test locations.

Compilation means selectively add to the database of historical information the property information associated with the process characteristic of the process unit received from the multiple test locations based upon the compilation criteria. The computing means also select at least a portion of the property information associated with the process characteristic of the process unit based upon the selection criteria. In addition, the computing means manipulate the selected property information associated with the process characteristic of the process unit based upon the manipulation criteria.

Comparison means compare the manipulated property information associated with the process characteristic of the process unit against the limit. Output means indicate a first disposition of the process unit when the manipulated property information associated with the process characteristic of the process unit violates the limit, based upon the disposition criteria. The output means indicate a second disposition of the process unit when the manipulated property information associated with process characteristic does not violate the limit, based upon the disposition criteria.

Thus, the computerized system uses the knowledge that has been acquired from previously processed process units, as contained in the database of historical information, to indicate first and second dispositions, depending upon how the property information associated with the process characteristic of the process unit compares to the limit. In this manner the restricted source, as the provider of the various criteria, is the sole seat of the decision making authority, and more consistent, better reasoned decisions are made. Thus, others with less training, poorer judgment, or emotionally clouded reason are not in a position to make spurious decisions in regard to either the disposition of the lot or control of the process. The first and second dispositions, based upon the disposition criteria, can contain explicit instructions in regard to these or many other factors. Further, by concentrating the decision making authority to a restricted source, as administered through the computerized system, the time previously lost by multiple people attempting to make the difficult decisions inherent in process testing and analysis is reclaimed.

In various preferred embodiments of the system the limit is a scrap limit where the first disposition is to scrap the process unit and the second disposition is to pass the process unit. In an alternate embodiment the limit further comprises a learning limit where the first disposition is to gather additional property information associated with the process characteristic of the process unit and the second disposition is to pass the process unit.

In a most preferred embodiment, which is a blend of the two alternate embodiments described above, the limit is both a scrap limit and a learning limit. In this embodiment with two limits, the first disposition in regard to the scrap limit is to scrap the process unit, and the second disposition in regard to the scrap limit is to compare the manipulated property information associated with the process characteristic of the process unit against the learning limit. The first disposition in regard to the learning limit is to gather additional property information associated with the process characteristic of the process unit, and the second disposition in regard to the learning limit is to pass the process unit.

Preferably, the output means indicate specific tests to be accomplished on the process unit, so as to gather additional property information associated with the process characteristic of the process unit when the manipulated property information associated with the process characteristic violates the limit and the first disposition of the process unit is indicated.

Also in a preferred embodiment, the computing means mathematically determine a plurality of limits based upon the limit criteria, make a plurality of selections from the property information associated with the process characteristic of the process unit based upon the selection criteria, and independently manipulate the plurality of selections based upon the manipulation criteria. In this embodiment, the comparison means independently compare the plurality of manipulated selections against the plurality of limits, and the output means indicate a first disposition of the process unit and second disposition of the process unit for each independent comparison of the plurality of manipulated selections against the plurality of limits.

In a method for selecting a disposition of a process unit according to the present invention, a database is compiled of historical information relating to previously sensed property information associated with a process characteristic of the process unit. A limit is determined, based upon limit criteria. Property information associated with the process characteristic of the process unit is sensed. The sensed property information associated with the process characteristic of the process unit is selectively added to the database of historical information, based upon compilation criteria. At least a portion of the sensed property information associated with the process characteristic of the process unit is selected, based upon the selection criteria.

The selected property information associated with the process characteristic of the process unit is manipulated based upon manipulation criteria. Then, the manipulated property information associated with the process characteristic of the process unit is compared against the limit. A first disposition of the process unit is selected when the manipulated property information associated with the process characteristic of the process unit violates the limit. A second disposition of the process unit is selected when the manipulated property information associated with the process characteristic of the process unit does not violate the limit.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
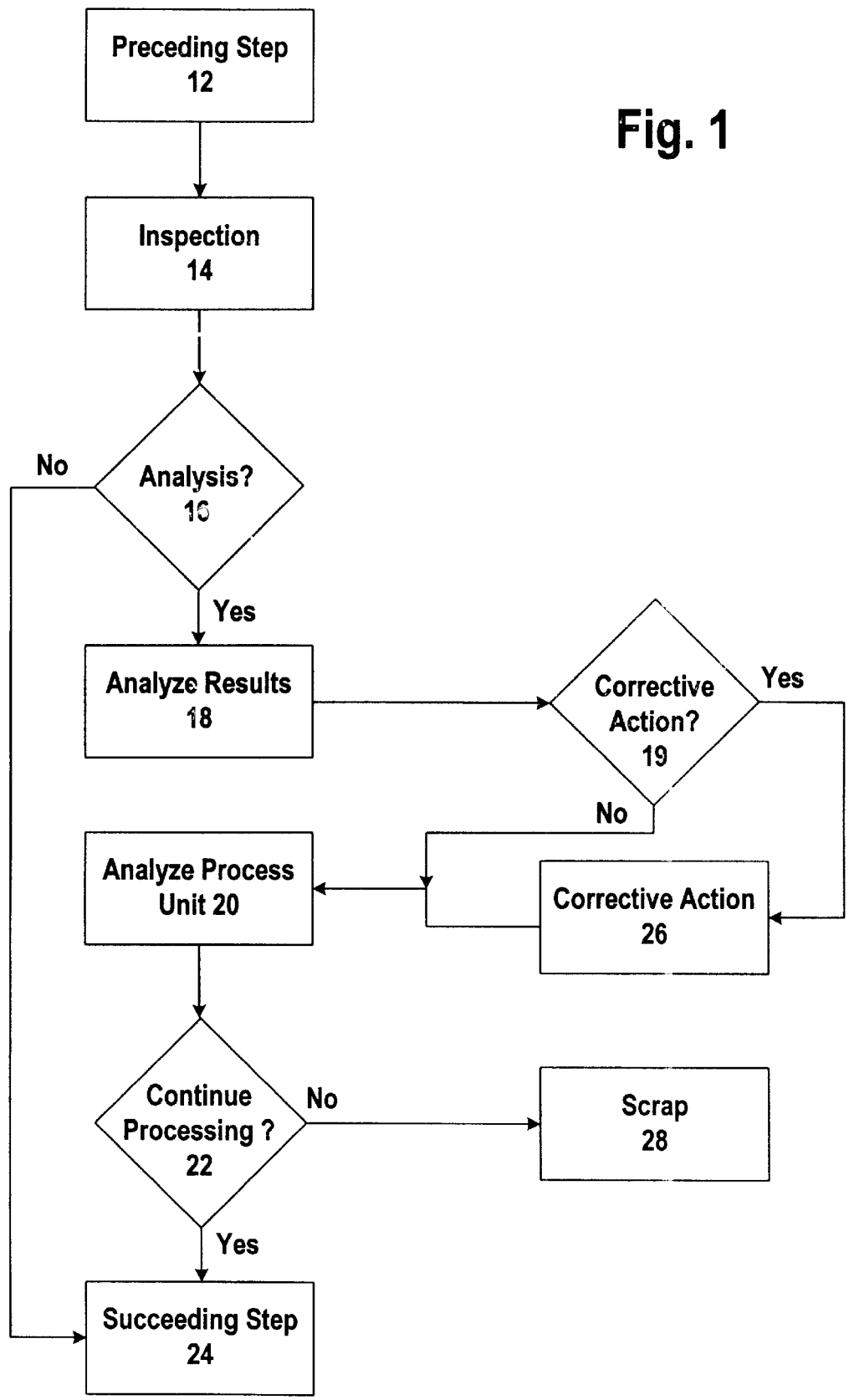
FIG. 1 is a flow chart for a preferred embodiment of a method according to the present invention.

Referring now to FIG. 1, there is depicted a flow chart for a preferred embodiment of a method according to the invention. The flow chart generally depicts the major steps of the method used to move a process unit, such as a wafer, through a processing sequence. In the flow chart of FIG. 1, the processing sequence is represented as the considerations raised by the method in moving the processing unit from preceding step 12 to succeeding step 24. These process steps 12 and 24 are not given the names of any of the specific process steps that are inherent in wafer processing, for example, because the steps of the method in moving the process unit from the preceding step 12 to the succeeding step 24 are generally applicable to most if not all of the various steps in such a process, or in other processes. In other words, the steps of the method as described below have general applicability between any two given steps in a process, and not just between two particular steps in a particular process.

After the process unit has completed the processing inherent in the preceding step 12, an inspection 14 is performed. The inspection 14 is most preferably performed in regard to the process characteristic that is inherently effected by the processing accomplished in the preceding step 12. However, this is not a requirement of the method as described herein, and there may be valid reasons why it is desirable to postpone the inspection 14 of the process characteristic effected by a processing step that is one or more steps prior to the preceding step 12 that directly precedes the inspection 14.

During the inspection 14, property information associated with the process characteristic of the process unit is sensed. Typically, this is accomplished with a test instrument of some sort. For example, a test instrument may be used to sense property information such as the number, size, and location of particles on a wafer. In this example, the process unit is a wafer and the process characteristic is the contamination present on the wafer. The selections of property information in this example include categories such as, but not limited to, the total number of particles on the wafer, a histogram of particles on the wafer according to particle size, the total number of particles on the wafer that exceed a given size, and an indication of the geographical distribution of the particles across the surface of the wafer. Of course, this is by way of example only and many other types of process units, process characteristics, and property information are included within the scope and spirit of the present invention.

The property information that is sensed from the process unit in regard to the process characteristic is used in conjunction with other elements described below to determine a disposition for the process unit. In other words, this property information and the other elements are used to determine the path by which the process unit progresses from the preceding step 12 to the succeeding step 24, or if it will progress to the succeeding step 24 at all.

The selections of the property information, such as those described above, may be programmed into the test instrument used to sense the property information. For example, an instrument that detects particles on the surface of a wafer can be programmed to classify the size, number, and location of the particles detected on the wafer according to the categories mentioned above, or other or additional categories. The programmed or hand-extracted selections of information can be reported in a variety of methods. For example, the output can be reported in a printed format, an on-screen format, or sent directly to another computing system in an electronic format.

In a preferred embodiment, the test instrument does not contain any limits or other criteria that are used to determine whether a further analysis of the test results or the process unit should be accomplished. Most preferably, even if the test instrument is capable of performing such functions, these functions are not used, except as explained in more detail hereafter. The reason that such functions are preferably not used is that this would tend to lead the decision making process back to the individual that is performing the tests, rather than towards the centralized decision making entity. An exception to this would be if the test instrument has the capability to communicate with the other elements of the system as described herein. In this limited case, the test instrument performs several of the functions of the method and provides several elements of the system as described herein, including test instrument, open input means, and output means, as described more completely hereafter.

In an alternate embodiment the test instrument does not perform any of the selection functions on the sensed property information. In this embodiment, the information output by the test instrument is in a raw format, and is either input completely by the operator to the system through the open input means, or the operator performs at least an initial selection of the property information for input to the system through the open input means. However, in the preferred embodiment as described above, the test instrument has the capability to perform at least an initial selection of the property information and present the selection to the operator for input to the system through the open input means.

The open input means are so entitled because there are generally either no restrictions or reduced restrictions upon who can provide data input on the open input means. This is in contrast to the secure input means that are described below. The open input means are preferably provided in many locations so that property information in regard to many different process units and process steps can be entered into the system and evaluated.

For example, as described above in regard to the particle count on a wafer, the test instrument may provide a map of the particles that have been detected on the wafer surface, together with tables of selected and manipulated property information such as histograms, averages, and distributions. For example, some of the manipulation as contemplated herein may include mean, standard deviation, range, and running range of various combinations of the sensed property information, or the historical information.

The operator preferably enters property information into the system via the open input means. It is preferred that the system receives the property information, rather than presenting limits to the operator and allowing the operator to compare the selected and manipulated property information to the limits. This is exactly the type of situation where comparison mistakes are made, and where improper interpretations by different operators are made.

Thus, rather than using the system to present the specification limits to the operator to make a comparison between the sensed property information and the specification limits, the operator presents the sensed property information to the system to make a comparison between the sensed property information and the specification limits. Therefore, there is a fundamental difference between this aspect of the invention and traditional testing methods.

To continue, as alluded to above there are several methods by which the operator sends the property information to the system through the open input means. The property information can be read off the screen of the test instrument and typed in to the system via a keyboard, or the property information can be read off a printed report produced by the test instrument and read into the system via a scanner. Further, the operator can merely confirm that the property information is available for upload from the test instrument, and then instruct the test instrument to deliver the property information directly to the system via an electronic communication means. In this last example, the property information may be in either the selected and manipulated format, or it may preferably be in a raw format, allowing the system to select and manipulate the information according to centralized and preprogrammed routines, based upon criteria such as the type of property information that is received.

The system evaluates the property information provided to it through the open input means according to one or more of a variety of methods. In one embodiment, the property information is compared to a limit that is mathematically determined according to limit criteria. The limit criteria is preferably received from a secure input means, so that only a restricted source can change the limit criteria. The restricted source may be a physical source, such as a secured terminal that can provide input to the system, or the restricted source may be a person or a group of people having restricted access to the system, such as by a password or other form of identification.

Thus, the secure input means differ in function from the open input means, even if the secure input means are not physically different than the open input means. The secure input means provide the means by which the restricted source is able to input the various criteria to the system, upon which all of the processing decisions are made. The open input means provide the means by which others, such as operators, provide the sensed property information to the system so that the property information can be acted upon by the various criteria and processing decisions can be made.

The limit criteria may take one or more of several different forms. For example, the limit criteria may specify the limit itself, such as, to continue one of the examples from above, no more than a specified number of particles of a specified size within a specified surface area are tolerable on the wafer. Alternately, the limit criteria may specify a manner in which the historical data resident on the system is manipulated in order to compute a limit. In this latter embodiment, the limit criteria do not specify a value per se, but rather specify the manner by which a value or a group of values are determined. For example, the limit criteria may specify that the limit is determined by computing the six sigma range around the arithmetic mean of a specified selection of historical data corresponding to the particular property information that has been sensed by the test instrument. Thus, in this example the limit criteria is used to determine the limit, rather than to provide the limit.

When the selected and manipulated property information has been compared to the limit by the system, the output means present a disposition of the process unit to the operator based upon the disposition criteria. A part of the output that is presented to the operator on the output means may be a trend analysis of the historical information and the property information, such as a control chart.

Preferably, there is at least a first disposition to be accomplished when the limit has been violated, and at least a second disposition to be accomplished when the limit has not been violated. For example, if the limit is a scrap limit, and the manipulated property information associated with the process characteristic of the process unit violates the scrap limit, then the output means may present to the operator the first disposition of placing the process unit on a shelf that is designated for process units that are not to receive further processing, or in other words that are to be scrapped. Further, if the manipulated property information associated with the process characteristic of the process unit does not violate the scrap limit, then the output means may present to the operator the second disposition of placing the process unit on a shelf that is designated for process units that are to be taken to the processing location for the succeeding step 24.

However, in more preferred embodiments of the invention, more than one limit is specified. Most preferably there is included in the limit criteria either a learning limit itself or the instructions necessary to compute a learning limit, such as by selection and manipulation of the historical property information. The learning limit does not necessarily specify that the process unit is to be scrapped or that that the process unit is to be passed to the succeeding step 24. Rather, the learning limit specifies whether further analysis should be accomplished.

If the learning limit is violated, the first disposition may be to perform additional analysis. If the learning limit is not violated, the second disposition may be to not perform additional analysis but to rather pass the process unit to succeeding step 24. The type of analysis that may be specified by the system is described with more detail at a later point in this discussion. This decision of whether a limit is violated and what type of limit it is, is represented in FIG. 1 as the "Analysis" decision block 16.

In a most preferred embodiment, the concepts of the scrap limit and the learning limit are combined, such as exemplified by the following. The system first compares the preferably selected and manipulated property information for the process unit to one or the other of the limits. For example, the system compares the property information to the learning limit. If the learning limit is not violated and further analysis is not indicated, then the second disposition of the process unit is to pass the process unit to the succeeding step 24. If the learning limit is violated, then the first disposition of the process unit is to indicate to the operator exactly what further analysis should be performed.

To continue the example from above, the system may then next compare the selected and manipulated property information for the process unit to the other of the limits, which in this example is the scrap limit. If the scrap limit is not violated, then the second disposition of the process unit may be to pass the process unit to the succeeding step 24. This is represented diagrammatically in FIG. 1 as the "Continue Processing" decision block 22. However, if the learning limit has been violated, as described above, then the operator may additionally be instructed to place all of the results of the analysis that has been performed on a shelf to await the review of an engineer. The process unit itself may or may not be held for the review of the engineer, depending upon the specific disposition criteria received from the restricted source on the secure input means.

If the scrap limit is violated, then the first disposition of the process unit may be to hold the lot for review of an engineer, as described above. In most situations it will be inherent that if the scrap limit is violated, then the learning limit will also have been violated. However, this is not true in all instances. There may be a process that is very well understood within certain ranges of the property information associated with the process characteristics that are effected by the process. In such a process, the learning limits may actually be outside of the scrap limits. For example, it may not be necessary to gather more information in regard to the process unit unless the property information associated with the process unit is outside of a range of property information that is understood. As mentioned above, this range may also be outside of the range of acceptable process units, or in other words, outside of the scrap limit.

The system 10 can also suggest the disposition of the process unit based upon additional criteria. For example, instead of one or two limits based upon a single process characteristic, the system 10 can accept from the open input 34 property information in regard to a plurality of process characteristics, and then manipulate the property information received in such a manner that very complex disposition decisions can be made by the system 10 based upon the disposition criteria received from the secure input 32.

For example, one or more limits can be calculated or received for each of one or more process characteristics. The process information in regard to these process characteristics is received by the system 10 through the open input 34, and compared by the comparator 40 to the appropriate limits. The disposition indicated by the output means is determined by the interrelation between those limits that are violated and those limits that are not violated. In other words, if a first set of limits is violated, then a first disposition is indicated, if a second set of limits is violated, then a second disposition is indicated, and if a third set of limits is violated, then a third disposition is indicated. Alternately, if a first, second or third set of limits is violated then a first disposition is indicated and if a fourth, fifth or sixth set of limits is violated then a second disposition is indicated.

As a further example, the property information from a process unit may represent four different process characteristics. Each of these four different process characteristics may have associated with it three different limits. A first disposition may be selected for the process unit if the first and second limits for the first and second process characteristics are violated, and a second disposition may be selected for the process unit if the first and second limits for the first and third process characteristics are violated. Thus, patterns of violated limits may be used to select from a series of different dispositions.

Further, the disposition may be based at least in part on a further calculated index. To continue the preceding example, the index may be calculated by multiplying, for example, a set of values for the property information by a first given factor when those values violate a given set of limits, and multiplying the values for the property information by a second given factor when those values violate an alternate set of limits, or when a different set of values violates a given set of limits. In other words, the various possible dispositions for the process unit, including scrapping the process unit, holding the process unit, passing the process unit, acquiring further process information, performing additional or alternate processing, or making adjustments to the process for succeeding process units can all be based on patterns of the limits that are met or violated, and indexes based on manipulated combinations of the values of the property information, where the manipulations and combinations are selectively predicated on the patterns of the limits that are met or violated.

The property information sensed by the test instrument from the process unit is selectively added to the historical database of property information, based upon the compilation criteria received through the secure input means from the restricted source. In one embodiment, the compilation criteria specify that all property information is added to the historical database. In an alternate embodiment the compilation criteria specify that at least a designated portion of the property information that meets certain of the compilation criteria is to be either included in or excluded from compilation with the historical database of property information.

For example, if a portion of the property information is outside of given limits as specified by either the compilation criteria or the limit criteria, and there is an identifiable cause for the property information to be outside of the given limits, then the compilation criteria may specify that the property information that is outside of the given limits is an artifact and is to be selectively excluded from compilation into the historical database of property information. Similarly, if there is no identifiable cause for the property information to be outside of the given limits, then the compilation criteria may specify that the property information that is outside of the given limits is to be included in the compilation of property information that is added to the historical database of property information. Of course, these specific recitations are by way of example only, and there are other criteria besides property information that is outside of given limits for which identifiable causes exist that can be used to include and exclude information from that property information that is to be compiled with the historical property information.

The decision as to whether there should be a further analysis 16 is preferably made by the system, as explained above, when the indication of the disposition of the process unit is made. In the case where the disposition of the process unit selected by the system indicates that further analysis is to be accomplished, such as when a learning limit or a scrap limit is violated, there are preferably two levels of analysis that are performed. The first level of analysis is the analysis of the results, as indicated in block 18 of FIG. 1. In this first level of analysis, any corrective action, represented by block 26 of FIG. 1, that may be required or desirable, based upon the outcome of the comparison of the property information with the relevant limits in block 19, may be identifiable based solely on the property information that has already been gathered, together with the property information contained in the historical database.

For example, upon analysis, the property information sensed by the test instrument may demonstrate very clearly that a certain type of process error has occurred, which process error is known and well evaluated. In this situation, further analysis of the process unit 20 is not necessary, because no additional utile information in regard to the nature and character of the process error would tend to be discovered by means of the additional analysis of the process unit, as represented by block 20 in FIG. 1. Thus, the property information that has already been collected is sufficient for the corrective action 26 to be taken. Preferably, the system itself is able to discern this situation based upon the relevant criteria from the restricted source, and the system informs the operator of such by means of indicating specific action to be taken through the use of the output means connected to the system.

Alternately, a more thorough analysis of the results is not sufficient to adequately identify the nature of the process error or errors that have occurred, and further analysis of the process unit itself is required, as represented by block 20 in FIG. 1. Again, similar to that as described above, the system itself, by virtue of the criteria received through the secure input means from the restricted source, makes this decision and provides all relevant output in regard to additional action to be taken to the operator via the output means connected to the system, such as a display panel. Again, based upon the results of this additional analysis of the process unit, correction action is preferably taken.

For example, if the system determines that additional analysis of the process unit should be accomplished, then the system may indicate to the operator the specific tests that are to be additionally performed. Then the system may indicate to the operator that the process unit, together with all of the results of the sensed property information, is to be placed on a shelf to await more specific review by an engineer. Alternately, the system instructs the operator to either pass the process unit to the succeeding step 24, or to scrap the process unit 28, and to hold just the property information that has been gathered for the review of an engineer.

In yet a further alternate embodiment, the system instructs the operator to upload the additional property information and analysis to the system, where it is either held for review by the restricted source, or is automatically analyzed by the system according to criteria received from the restricted source.

Thus, there are several differences between the system and method as explained above, and a more traditional system. Specifically, the operator sensing the property information with the test instrument does not make any of the decisions in regard to the disposition of the process unit. The operator does not even so much as make the comparison of the selected and manipulated property information to the limits. Rather, the operator inputs the property information to the system, which preferably performs the selection and manipulation of property information internally, and makes the comparison to the limits internally as well. Thus, the operator is presented with at least a first or second disposition, including specific instructions as to what to do in terms of further analysis or process unit testing.

A larger difference between the system as described above and prior art systems is that the present system has a centralized criteria source in the restricted source, rather than having a distributed criteria source in each and every engineer or operator throughout all of the processing facilities. In the preferred embodiment of the present invention, all facilities for a single company, for example, are tied together by the system and use the same centralized historical database and criteria source. Of course, the system does not need to be implemented world-wide in order to provide the benefits described herein. The system provides the benefits described herein regardless of whether it is implemented on a world-wide basis across all product lines, world-wide for a single product line, within a single facility for all product lines, or even at a single test station for a single product line, for example. However, the benefits realized tend to be commensurate with the scale at which the system is implemented.

Figure 2:
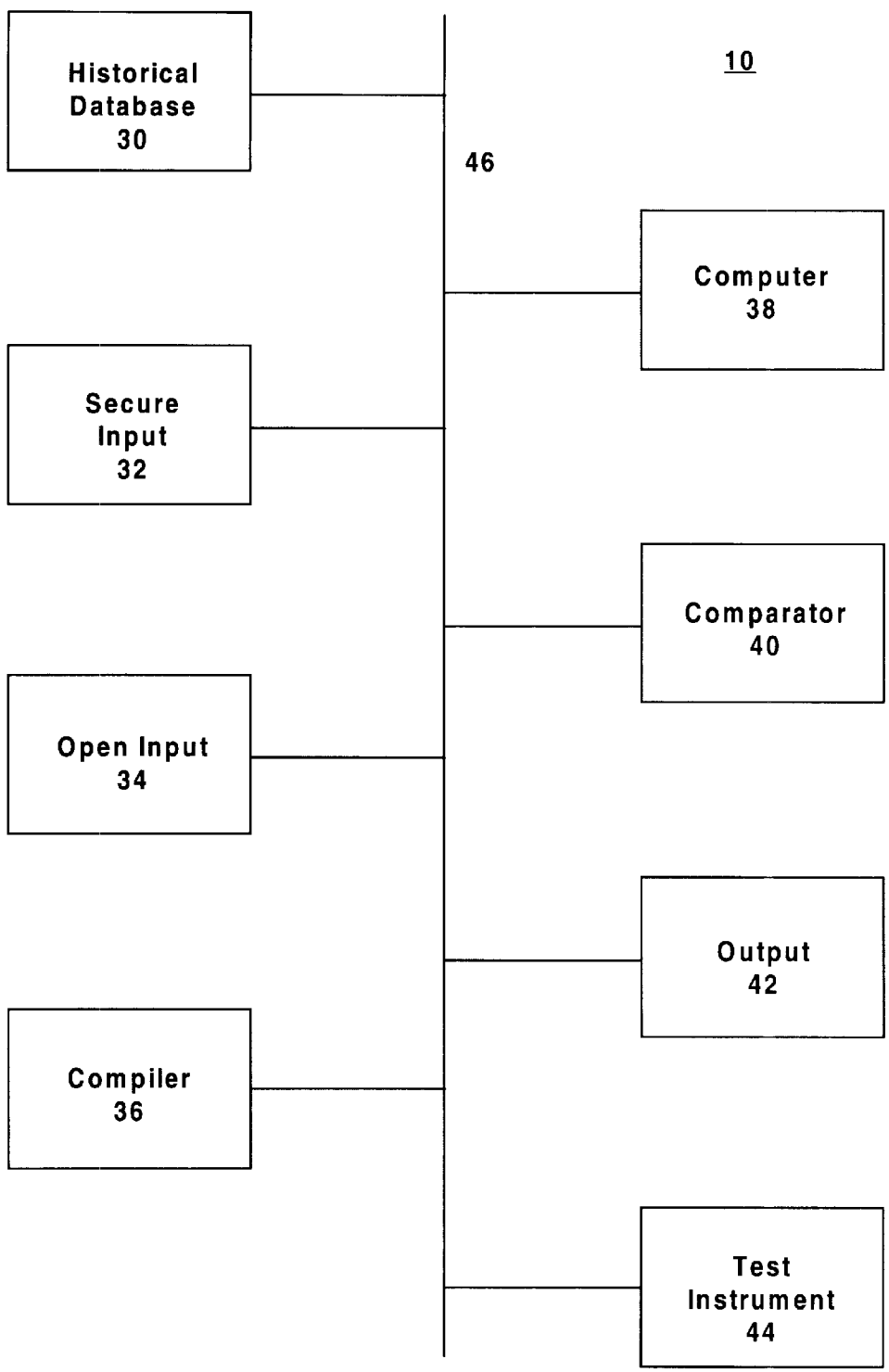
FIG. 2 is a functional block diagram for a preferred embodiment of an apparatus according to the present invention.

FIG. 2 depicts a functional diagram of the system 10 according to the present invention. It is appreciated that the system 10 as depicted in FIG. 2 presents the major functional units of the system 10, and does not attempt to definitively state the exact nature, division, or location of those functional units. Thus, one or more of the functional units as depicted may be present in a single apparatus, rather than distributed across more than one apparatus, as may tend to be indicated by a literal reading of FIG. 2.

As depicted, the various functional elements communicate one with another via network means 46. Although depicted as a single set of lines, network means 46 represent any of the communication means that are now known to provide communication between the functional elements of the system 10 as described herein, together with any other communication means that may yet be found to provide the communication between the functional elements.

Thus, network means 46 may be a plurality of communications, each of the plurality of communication means selected for one or more of a variety of factors to be optimized, such as optimal speed and reliability of communication between any two or more of the functional units. The network means 46 may thus be different communication means between different of the functional units. Further, one type of communication means may be preferred for communication in a first direction between two functional units, and a different type of communication means may be preferred for communication in a second direction between the same two functional units.

A historical database 30 contains the property information associated with the various process characteristics of the process units. Thus, the historical database 30 may contain property information in regard to a single process characteristic, or more preferably, in regard to many process characteristics of one or more types of process units. The historical database may be implemented on a storage means such as a computer hard drive.

The computer 38 controls many of the other elements of the system 10, and preferably provides the computational functions that are inherent in some of the other elements, as described below. The computer 38 may be a mainframe, server, or personal computer, or even an embedded controller in an application specific computing device designed to provide the services as described herein. The secure input 32, also as described above, may be a remote terminal that is secured by some method such as by secure location or secure login. Thus, at different times, the secure input 32 may be the same physical terminal as the open input 34, but accessed by the restricted source who, such as by entry of a password, is provided access to the criteria designation and other limited functions of the system 10 as described.

The compiler 36 is the element of the system 10 that, under the direction of the compilation criteria, selectively adds the newly sensed property information to the historical database 30. This is one of the elements that may preferably be contained physically within the computer 38. The comparator 40 is the element of the system 10 that compares the selected and manipulated property information from the process unit to the limits that are defined in response to the limit criteria. This function also is preferably contained physically within the computer 38.

The output 42 may be a printer or a display screen. In a most preferred embodiment, the output 42 is a terminal, such as that which provides the functions of either or both of the secure input 32 and the open input 34. The test instrument 44 may be a stand-alone unit, meaning either that the communication means between it and the other elements is not an electronic communication means, or that the test instrument 44 provides no other functions than those inherent in the sensing of the property information associated with the process characteristic of the process unit.

Alternately, the test instrument 44 itself can provide at least limited terminal functionality, and provide the physical embodiment of one or more of the secure input 32, the open input 34, and the output 42. Thus, in one highly specialized embodiment of the invention, there are only three physical units, 1) the computer 38 which contains the historical database 30, the compiler 36, and the comparator 40, 2) the test instrument 44 which contains the secure input 32, the open input 34, and the output 42, and 3) the network means 46 which provides electronic communication between the computer 38 and the test instrument 44.

It is appreciated that the invention as described above comprehends numerous adaptations, rearrangements, and substitutions of parts, all of which are considered to be within the scope and spirit of the invention as described, and that the scope of the invention is only to be restricted by the language of the claims given below.

What is claimed is:

1. A computerized system for analyzing property information associated with a process characteristic of a process unit, the system comprising:
 a database of historical information relating to previously compiled property information associated with the process characteristic,
 secure input means for receiving limit criteria, compilation criteria, selection criteria, manipulation criteria, and disposition criteria from a restricted source, computing means for mathematically determining a limit based upon the limit criteria, open input means for receiving the property information associated with the process characteristic of the process unit from multiple test locations, compilation means for selectively adding to the database of historical information the property information associated with the process characteristic of the process unit received from the multiple test locations based upon the compilation criteria, the computing means further for selecting at least a portion of the property information associated with the process characteristic of the process unit based upon the selection criteria, the computing means further for manipulating the selected property information associated with the process characteristic of the process unit based upon the manipulation criteria, comparison means for comparing the manipulated property information associated with the process characteristic of the process unit against the limit, and output means for indicating a first disposition of the process unit based on the disposition criteria when the manipulated property information associated with the process characteristic of the process unit violates the limit, and for indicating a second disposition of the process unit based on the disposition criteria when the manipulated property information associated with the process characteristic does not violate the limit.

2. The computerized system of claim 1 wherein the limit further comprises a scrap limit, the first disposition is to scrap the process unit, and the second disposition is to pass the process unit.

3. The computerized system of claim 1 wherein the limit further comprises a learning limit, the first disposition is to gather additional property information associated with the process characteristic of the process unit, and the second disposition is to pass the process unit.

4. The computerized system of claim 1 wherein the limit further comprises a scrap limit and a learning limit, the first disposition in regard to the scrap limit is to scrap the process unit, and the second disposition in regard to the scrap limit is to compare the manipulated property information associated with the process characteristic of the process unit against the learning limit, and the first disposition in regard to the learning limit is to gather additional property information associated with the process characteristic of the process unit, and the second disposition in regard to the learning limit is to pass the process unit.

5. The computerized system of claim 1 wherein the output means further indicate specific tests to be accomplished on the process unit to gather additional property information associated with the process characteristic of the process unit when the manipulated property information associated with the process characteristic violates the limit and the first disposition of the process unit is indicated.

6. The computerized system of claim 1 further comprising:

the computing means for mathematically determining a plurality of limits based upon the limit criteria, for making a plurality of selections from the property information associated with the process characteristic of the process unit based upon the selection criteria, and independently manipulating the plurality of selections based upon the manipulation criteria, and the comparison means for independently comparing the plurality of manipulated selections against the plurality of limits, and the output means for indicating a first disposition of the process unit and a second disposition of the process unit for each independent comparison of the plurality of manipulated selections against the plurality of limits.

7. The computerized system of claim 1 further comprising:

the computing means for mathematically determining a plurality of limits based upon the limit criteria, for making a plurality of selections from the property information associated with the process characteristic of the process unit based upon the selection criteria, and independently manipulating the plurality of s elections based upon the manipulation criteria, and the comparison means for independently comparing the plurality of manipulated selections against the plurality of limits, and the output means for selectively indicating a first disposition of the process unit and a second disposition of the process unit based upon a pattern of the comparison of the plurality of manipulated selections against the plurality of limits.

8. The computerized system of claim 1 wherein the manipulation criteria further comprise at least one of property information mean, property information standard deviation, property information range, and property information running range.

9. The computerized system of claim 1 further comprising reporting means for displaying trend analysis of the historical information and the property information.

10. The computerized system of claim 1 wherein the restricted source further comprises an engineer responsible for a process that governs the process characteristic.

11. The computerized system of claim 1 wherein the compilation criteria further comprises accepting the property information for compilation when artifacts do not exist within the property information and rejecting the property information for compilation when artifacts exist within the property information.

12. The computerized system of claim 1 wherein the process characteristic further comprises at least one of a particle count measurement, a particle distribution measurement, a particle size measurement, and a defect type and classification.

13. The computerized system of claim 1 further comprising test instruments disposed at the multiple test locations, the test instruments for sensing the property information associated with the process characteristic of the process unit and providing the property information to the open input means.

14. A method for selecting a disposition of a process unit, the method comprising:

compiling a database of historical information relating to previously sensed property information associated with a process characteristic of the process unit, determining a limit based upon limit criteria, sensing property information associated with the process characteristic of the process unit, selectively adding to the database of historical information the sensed property information associated with the process characteristic of the process unit based upon compilation criteria, selecting at least a portion of the sensed property information associated with the process characteristic of the process unit based upon selection criteria, manipulating the selected property information associated with the process characteristic of the process unit based upon manipulation criteria, comparing the manipulated property information associated with the process characteristic of the process unit against the limit, selecting a first disposition of the process unit when the manipulated property information associated with the process characteristic of the process unit violates the limit, and selecting a second disposition of the process unit when the manipulated property information associated with the process characteristic of the process unit does not violate the limit.

15. The method of claim 14 wherein the step of determining a limit further comprises mathematically manipulating the database of historical information based on the limit criteria to determine the limit.

16. The method of claim 14 wherein the limit is a scrap limit and the step of selecting the first disposition further comprises scrapping the process unit and the step of selecting the second disposition further comprises passing the process unit.

17. The method of claim 14 wherein the limit is a learning limit and the step of selecting the first disposition further comprises gathering additional property information associated with the process characteristic of the process unit and the step of selecting the second disposition further comprises passing the process unit.

18. The method of claim 14 wherein the limit is a learning limit and the step of selecting the first disposition further comprises indicating specific tests to be accomplished on the process unit to gather additional property information associated with the process characteristic of the process unit.

19. The method of claim 14 wherein the step of mathematically manipulating the database of historical information further comprises determining a plurality of limits based upon the limit criteria, the step of selecting at least a portion of the sensed property information further comprises making a plurality of selections from the sensed property information associated with the process characteristic of the process unit based upon the selection criteria, the step of manipulating the selected property information further comprises independently manipulating the plurality of selections based upon manipulation criteria, the step of comparing the manipulated property information further comprises independently comparing the plurality of manipulated selections against the plurality of limits, and the steps of selecting the first disposition and the second disposition of the process unit further comprise selecting the first disposition and alternately the second disposition of the process unit for each independent comparison of the plurality of manipulated selections against the plurality of limits.

20. A computerized system for determining the capability of a process to produce process units having a process characteristic that does not violate a limit, the system comprising:

secure input means for receiving limit criteria, compilation criteria, selection criteria, and capability criteria from a restricted source, a test instrument for sensing property information associated with the process characteristic of the process unit, open input means for receiving the sensed property information associated with the process characteristic of the process unit from the test instrument, a database of historical information relating to previously compiled property information associated with the process characteristic, compilation means for selectively adding to the database of historical information the property information associated with the process characteristic of the process unit received from the test instrument based upon the compilation criteria, computing means for,
selecting at least a portion of the historical information associated with the process characteristic of the process unit based upon the selection criteria, mathematically manipulating the selected historical information associated with the process characteristic of the process unit to determine a capability parameter based upon the capability criteria, and mathematically determining a limit based upon the limit criteria, comparison means for comparing the capability parameter against the limit, and output means for indicating a first process capability indicator when the capability parameter violates the limit, and for indicating a second process capability indicator when the capability parameter does not violate the limit.

\* \* \* \* \*